United States Patent
Behrens

[11] Patent Number: 6,158,168
[45] Date of Patent: Dec. 12, 2000

[54] VEGETATION ELEMENT FOR GREENING ARTIFICIAL LEVEL EXPANSES

[76] Inventor: Wolfgang Behrens, Trespenmoor 1, D-27243 Gross Ippener, Germany

[21] Appl. No.: 09/269,370
[22] PCT Filed: Jul. 1, 1998
[86] PCT No.: PCT/DE98/01874
 § 371 Date: Mar. 25, 1999
 § 102(e) Date: Mar. 25, 1999
[87] PCT Pub. No.: WO99/37135
 PCT Pub. Date: Jul. 29, 1999

[30] Foreign Application Priority Data

Jul. 29, 1997 [DE] Germany ............ 197 32 604

[51] Int. Cl.[7] ............ A01C 1/04; C09K 21/00; C09K 17/52; A01G 7/00
[52] U.S. Cl. ............ 47/9; 47/56; 47/1.01 F; 252/603
[58] Field of Search ............ 47/56, 9, 101 F, 47/101 T; 252/603

[56] References Cited

U.S. PATENT DOCUMENTS

| | | | |
|---|---|---|---|
| 3,482,353 | 12/1969 | Fischer et al. | 47/9 |
| 3,713,404 | 1/1973 | Lavo et al. | 111/200 |
| 3,763,072 | 10/1973 | Krieger | 523/132 |
| 3,812,619 | 5/1974 | Wood et al. | 47/58 |
| 4,007,556 | 2/1977 | Gluck et al. | 47/56 |
| 4,155,314 | 5/1979 | O'Callaghan et al. | 111/200 |
| 4,665,993 | 5/1987 | Balassa | 169/44 |
| 5,218,783 | 6/1993 | Langezaal et al. | 47/64 |
| 5,226,255 | 7/1993 | Robertson | 47/56 |
| 5,390,442 | 2/1995 | Behrens | 47/59 |
| 5,458,662 | 10/1995 | Toyone | 47/58 |
| 5,836,107 | 11/1998 | Behrens | 47/56 |
| 6,029,395 | 2/2000 | Morgan | 47/9 |

FOREIGN PATENT DOCUMENTS

| | | |
|---|---|---|
| 0 573 949 A1 | 12/1993 | European Pat. Off. . |
| 25 13 686 | 7/1976 | Germany . |
| 79 35 851 | 4/1980 | Germany . |
| 44 20 974 A1 | 12/1995 | Germany . |
| 196 35 480 A1 | 3/1997 | Germany . |
| WO 95/13252 | 5/1995 | WIPO . |

*Primary Examiner*—Michael J. Carone
*Assistant Examiner*—James S. Bergin
*Attorney, Agent, or Firm*—Collard & Roe, PC

[57] ABSTRACT

A vegetation element for the greening of artificial expanses, made from a mixture of organic substrate particles, nutrients and synthetic material components; this mixture, by the addition of plastic foam components and binders being combined to form a uniform firm element. According to the invention, the vegetation element is characterised in that the mixture comprises a component of organic substrate particles exceeding 20% by weight, with the mixture being foamed-out with binders, with plant material able to germinate, such as seeds, sprouts, rhizomes or similar being added to the mixture, and in that at least one surface pointing away from the top surface of the vegetation element comprises a fire retardant.

10 Claims, 1 Drawing Sheet

VEGETATION ELEMENT FOR GREENING ARTIFICIAL LEVEL EXPANSES

BACKGROUND OF THE INVENTION

1. Field of the Invention

The invention relates to a vegetation element for greening artificial level expanses, in particular rooftops of buildings.

2. The Prior Art

For the greening of artificial level expanses, in particular the rooftops of buildings, vegetation elements are required which enable the growth of vegetation.

To this effect it has been known to use mats or elements of rock wool which inter alia comprise a substrate, and which, after pre-cultivation, are available as ready-made green vegetation elements. In many cases however, due to the possible loss of minute fibres, the use of rock wool is not desirable for health reasons. Yet vegetation elements made of mineral stone wool do offer the advantage of meeting the requirements for fire safety according to DIN 4102, part 7, without any further measures.

The German patent DE 25 13 686 discloses a supporting slab for soil-less vegetative growth, said supporting slab being produced by mixing flakes of at least partly open-pore plastic foams with nutrients and a binder as well as optionally with fillers. The foam materials and nutrients, as well as optionally the fillers, are mixed, while in a separate process a special adhesive mixture is produced, said adhesive mixture being subsequently evenly mixed with the mixture of foam materials and nutrients and optionally of fillers. The entire mixture obtained in this way is dried in a suitable mould, optionally under pressure and/or by application of heat; thus a vegetation slab is formed which comprises mainly plastic material with additives. A similar vegetation slab is known from the German utility model 79 35 851.

While such vegetation slabs have largely proven to be successful, they do not however meet the requirements prescribed by DIN 4102 part 7. So far it has been particularly difficult, in the case of hitherto known vegetation slabs, to provide proof of resistance to fires caused by flying brands and to radiated heat. Thus, for example a directive issued by the Minister for Urban Development, Habitation and Transport of the Land of North Rhine-Westphalia (no. 54 of 15.9.1989) prescribes that in the case of rooftops with extensive greening, resistance to fires caused by flying brands and to radiated heat is deemed to be adequate only if there is a substrate layer at least 3 cm in thickness comprising no more than 20% by weight organic components.

Thus, so far vegetation-bearing elements comprising a higher percentage of organic substrate particles have so far met with certain prejudices concerning fire safety.

However, from the point of view of plant physiology, a percentage of organic substances exceeding 20% by weight may well be advantageous, for only these organic components are able, in particular by natural decomposition processes, to release the required nutrients to the plants.

SUMMARY OF THE INVENTION

This is the starting point for the present invention whose object it is to provide a vegetation-bearing element of the type mentioned in the introduction which contains more than 20% by weight of organic substances and yet meets the requirements prescribed by DIN 4102 part 7.

This object is achieved by a vegetation element of the invention. The invention provides for the mixture to comprise a percentage of organic substrate particles exceeding 20% by weight, with the mixture being foamed-out with binders, with plant material able to germinate, such as seeds, sprouts, rhizomes or similar being added to the mixture, and in that at least one surface pointing away from the top surface of the vegetation element comprises a fire retardant. The binder used can be a foam material such as an elastic composite foam or a flake foam, for example the product DESMODUR and DESMOPHEN are both trademark products of the BAYER AG corporation, Kaiser-Wilhelm-Allee, D-51373, Leverkusen. Main components of the "DESMODUR" product are diisocyanates. Principal components of the "DESMOPHEN" product are polyols. The use of latex as a binder is also imaginable. According to an advantageous embodiment of the invention, the organic components can be cocos fibres, in particular cocos fibres in certain fractions, for example so-called husk chips. However, the use of other organic particles such as hemp stems, flax or natural sponge is also imaginable. These are all open-pore materials suitable for water retention.

The surprising novelty of the vegetation element according to the invention manifests itself in particular in that by actively equipping the vegetation element with a fire-retardant, preferably water glass, the use of a fraction of organic substances which is advantageous from a plant-physiological point of view is now possible, without limiting the requirements of the vegetation element concerning fire safety.

Equipping the vegetation element with a fire retardant provides a further positive side effect. It has been observed that equipping a vegetation element with a suitable fire-retardant, in particular with water glass, enables water accumulation in the vegetation element. Such water accumulation can be very desirable, especially over long dry periods.

With regard to water accumulation too, the invention turns away from hitherto known approaches. So far, in particular in the already cited German patent specification 25 13 686 and in the German utility model 79 35 851, drainage below the actual vegetation element was provided for the water to run off as quickly as possible. While this protects the roof structure from waterlogging, at the same time the plants are exposed without protection from exposure to the sun's rays during extended dry periods, because up to now, known vegetation elements have not been able, especially in the critical dry period, to store water and release it to the plants.

The embodiment of the vegetation element according to the invention provides a further advantage in that, depending on the desired application, said vegetation element can be made in various shapes. Thus with appropriate shaping it can be used for greening fibre-cement panels, but the use for greening trapezoidal steel roofs, the application as a substrate backing for example for vegetation mats, for planting or seeding of artificial level expanses is imaginable, as is the application as a shaped part for commercially available balcony boxes or flowerpots.

To produce the vegetation element according to the invention, the required materials—if necessary—are granulated and mixed; subsequently the mixture is foamed-out into a mould, with a plant-compatible binder.

The invention has a further advantage in that it provides the possibility of industrial production with the result that the individual vegetation elements can be produced identically and that one vegetation element is similar to the other. This is due to all ingredients being mixed at the desired ratio and subsequently foamed-out, the finished vegetation element being made with a plant-compatible binder with said vegetation element then immediately supporting growth and enabling greening.

Practical embodiments of the invention provide for the fire-retardant to be worked into the vegetation element, for the percentage of fire retardant to be 1–30% by volume, and for the fire retardant to be water glass.

Further advantageous embodiments of the invention may provide for the fire retardant to be worked into the underside of the vegetation element, or for the fire retardant to be worked-in in at least one region of the lateral edges of the vegetation element. This fire retardant, in particular water glass, can be sprayed on or applied by brush. In this way penetration of the fire retardant into the vegetation element should be to a depth of about 0.5 cm. In the case of any fire, combustion only proceeds as far as this lower or lateral layer 0.5 cm in thickness.

It is particularly preferred if the vegetation element is greened by horticultural measures prior to installation on a roof. In this, greening of the vegetation element can be completed prior to installation on a roof, at ground level by intensive horticultural care. This provides a decisive advantage in that already prior to installation on the roof, any defective spots in greening can be rectified with relatively simple means and in an ergonomically favourable way, for example by applying to the defective spots plant material able to germinate, in particular sprouts, seeds and similar. For, if the vegetation element only starts greening after application on the roof, such defective spots occurring can only be remedied with difficulty and by relatively expensive means.

DETAILED DESCRIPTION OF PREFERRED EMBODIMENTS

Figure 1:
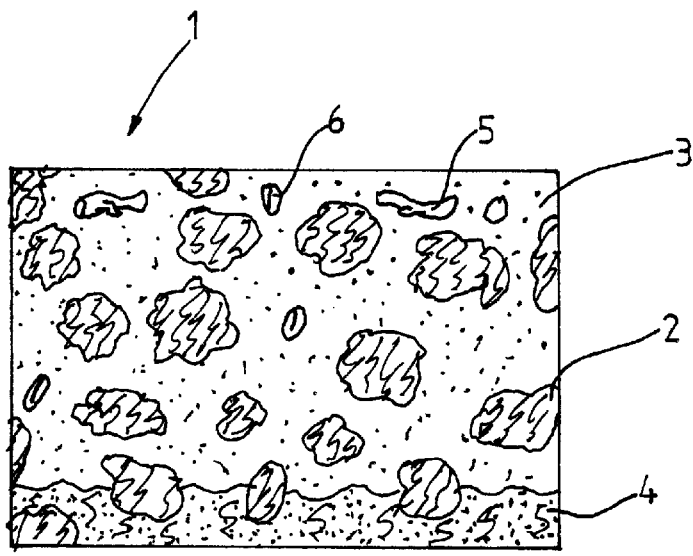
FIG. 1 shows a vegetation element of the invention with the fire retardant worked into the element underside thereof.

Turning now in detail to the drawings, FIG. 1 shows the vegetation element 1 containing organic substrate particles 2 (husk chips of cocos), with binding agent (vehicle) 3, and fire retarding agent 4 worked into the element underside and plant material 5 being sprouts, 6 being seeds.

Figure 2:
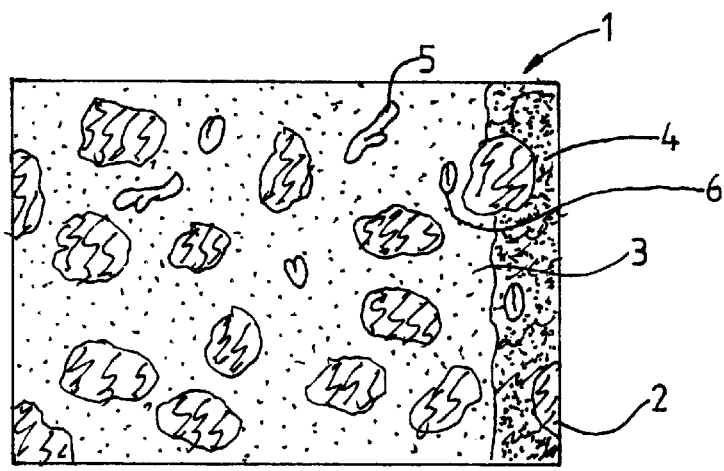
FIG. 2 shows a vegetation element of the invention with the fire retardant worked into the lateral edges of the element.

FIG. 2 shows vegetation element 1 containing organic substrate particles 2 (husk chips of cocos), with binding agent (vehicle) 3, and with fire retarding agent 4 worked into at least one region of the lateral edges of the vegetation element, and with plant material 5 being sprouts, 6 being seeds.

Figure 3:
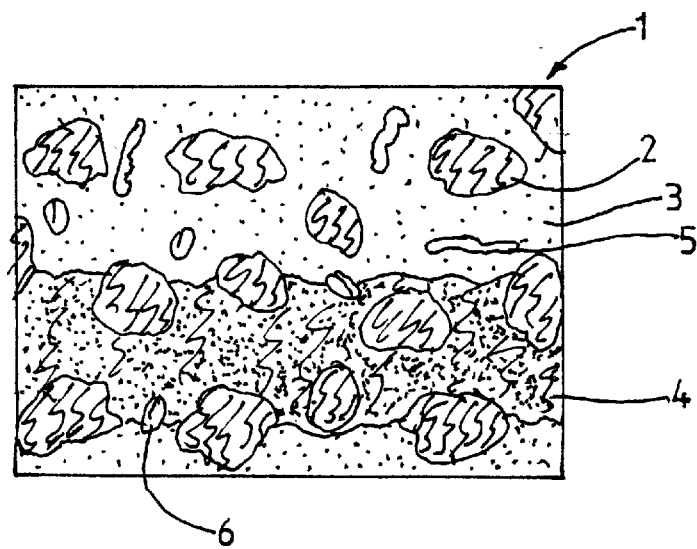
FIG. 3 shows a vegetation element of the invention with the fire retardant worked into the element.

FIG. 3 shows vegetation element 1, containing organic substrate particles 2 (husk chips of cocos) with binding agent 3 (vehicle), and with fire retarding agent 4 being worked into the vegetation element and with plant material 5 being sprouts, 6 being seeds.

What is claimed is:

1. A vegetation element for the greening of artificial expanses, comprising a mixture of organic substrate particles, nutrients and synthetic material components; said vegetation elements having a top surface and at least one other surface other than said top surface;

said mixture containing an addition of plastic foam components and binders being combined to form a uniform firm element, said mixture having a component of organic substrate particles exceeding 20% by weight, with the mixture being foamed-out with binders, with plant material able to germinate, being added to the mixture, and in that said at least one other surface other than the top surface of the vegetation element comprises a fire retardant.

2. A vegetation element according to claim 1, wherein the fire retardant is worked into the vegetation element.

3. A vegetation element according to claim 1, wherein the percentage of the fire-retardant is 1–30% by volume.

4. A vegetation element according to claims 1, wherein the fire retardant is worked into the underside of the vegetation element.

5. A vegetation element according to claim 1, wherein the fire retardant is worked into at least one region of the lateral edges of the vegetation element.

6. A vegetation element according to claim 1, wherein the fire retardant is water glass.

7. A vegetation element according to claim 1, characterised in that the organic substrate particles comprise at least in part cocos fibres.

8. A vegetation element according to claim 7, characterised in that at least part of the cocos fibres are husk chips.

9. A vegetation element according to claim 1, characterised in that greening of the vegetation element is completed by horticultural measures prior to installation on a roof.

10. A vegetation element according to claim 1, wherein said plant material able to germinate is selected from the group consisting of seeds, sprouts and rhizomes.

* * * * *